Figure 1D:
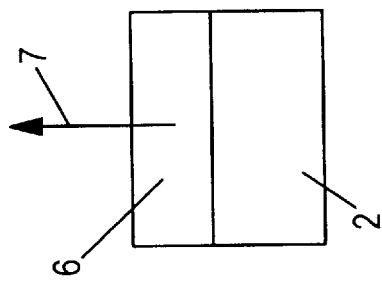

United States Patent

Zinke

[19]

[11] Patent Number: 5,769,777
[45] Date of Patent: Jun. 23, 1998

[54] METHOD FOR ABSORBING ORGANIC POLLUTANTS

[76] Inventor: Bernhard Zinke, Siedlerstrasse 5, D-03044, Cottbus, Germany

[21] Appl. No.: 696,882

[22] PCT Filed: Feb. 27, 1995

[86] PCT No.: PCT/DE95/00252

§ 371 Date: Oct. 28, 1996

§ 102(e) Date: Oct. 28, 1996

[87] PCT Pub. No.: WO95/23041

PCT Pub. Date: Aug. 31, 1995

[30] Foreign Application Priority Data

Feb. 25, 1994 [DE] Germany .......................... 44 06 714.3

[51] Int. Cl.[6] .............................. B09C 1/08; C09K 3/32; C02F 1/68; C02F 1/28

[52] U.S. Cl. .......................... 588/252; 210/691; 210/747; 210/925; 405/125; 405/263; 588/259

[58] Field of Search .................................... 210/691, 694, 210/747, 924, 925; 405/263, 128, 129, 74; 588/252, 257, 259

[56] References Cited

U.S. PATENT DOCUMENTS

| 3,749,667 | 7/1973 | Lindstrom | 210/924 X |
|---|---|---|---|
| 4,028,240 | 6/1977 | Manchak, Jr. | 588/252 |
| 4,514,307 | 4/1985 | Chestnut | 210/908 |
| 4,519,915 | 5/1985 | George et al. | 210/691 X |
| 4,615,809 | 10/1986 | King | 588/252 X |
| 4,741,834 | 5/1988 | Spangle et al. | 210/747 X |
| 4,909,849 | 3/1990 | Funderburk | 405/129 X |
| 5,057,227 | 10/1991 | Cohen | 210/691 X |
| 5,098,577 | 3/1992 | McLaughlin et al. | 210/694 X |
| 5,525,009 | 6/1996 | Hansen | 405/128 X |

FOREIGN PATENT DOCUMENTS

| 0 006 776 | 1/1980 | European Pat. Off. . |
|---|---|---|
| 144 274 | 10/1980 | German Dem. Rep. . |
| 201 649 | 8/1983 | German Dem. Rep. . |
| 23 39 143 | 6/1974 | Germany . |
| 41 06 052 | 8/1992 | Germany . |
| 2 249 972 | 5/1992 | United Kingdom . |
| WO 88/02739 | 4/1988 | WIPO . |
| WO 93/15831 | 8/1993 | WIPO . |

*Primary Examiner*—George A. Suchfield
*Attorney, Agent, or Firm*—Lowe Hauptman Gopstein & Berner

[57] ABSTRACT

The invention concerns a method for absorbing organic, ecologically stressed pollutants (1) such as oil, tar and phenols on grounds (12), rubble or solid disposal site surfaces which are floating on or in waters of a disposal site with liquid and/or sludge phases and/or solid sediments. This object is achieved in that in the invention fly ash (3) and/or cement-activated fly ash of large surface and evincing the structure of a hollow sphere, especially fly ash from lignite-powder fired boilers, is brought into contact with the pollutant, in that fly ash and pollutant are activated with water (5), being mixed into a pollutant-immobilized mixture (6) and being used in consolidating manner.

7 Claims, 2 Drawing Sheets

METHOD FOR ABSORBING ORGANIC POLLUTANTS

The invention concerns a method for absorbing organic, ecologically stressed pollutants such as oil, tar and phenols on grounds, rubble or solid disposal sites, floating on or in waters or in a disposal site designed as pollutant reservoir with liquid and/or sludge phases and/or solid deposits.

A number of technologies and materials are known for absorbing such pollutants and entail considerable costs in application, construction and waste removal, however without ensuring a correspondingly comprehensive immobilization for each of pollutant stress.

Illustratively adsorbents are used in the form of polymers (for instance East German patent 298,132; German patent 4,008,693); binders (for instance East German patents 144, 274; 201,649 and 234,370); German patents 4,108,089; 3,825,905; 2,951,776 and 2,452,061); carbonaceous materials (for instance East German patents 223,076; 296,069; 277,595 and 205,390; German patents 3,818,096 and 2,536, 807), foamed materials (for instance German patents 4,113, 125; 4,038,155 and 2,738,528; East German patent 137, 256); chemicals (for instance German patents 3,908,746; 3,507,917; 3,423,885 and 2,434,632); biological substances (for instance German patents 4,104,898; 3,818,096 and 1,769,461)) or microorganisms (for instance German patent 2,911,016). The polluted materials are processed by heating (for instance East German patents 294,684 and 297,575), by subtraction (for instance East German patent 223,076) or extraction (for instance German patent 4,233,584).

However special problems are caused by pollutants introduced by accidents into waters and by pollutants stored in waste disposals or in old dumps. Particularly severe problems are deposits with liquid and/or sludge phases. To control the last cited sedimentation, usually comprehensive and costly designs are required to prevent the pollutants from reaching either the ground water or the surface water. In these cases immobilization is possible only at exceedingly large expenditures of thermal or extraction treatments, still further costs being incurred for waste removal. Accordingly it is the object of the invention to employ simple means for absorbing pollutants and to achieve their immobilization.

In comprehensive and costly research over many years, it was found that fly ash and/or cement-activated fly ash of large surface and with the configuration of a hollow shell, in particular fly ash from lignite-powder fired boilers is brought into contact with the pollutant, that the fly ash and the pollutant are activated with water, mixed into mixture immobilizing the pollutant and are consolidated. If the pollutants are deposited on grounds, rubble or solid disposal areas, then in the method of the invention the fly ash is scattered dry on the pollutant, the pollutant as well as the fly ash then is mixed with water and next is seamlessly incorporated in the form of a pollutant-immobilized mixture into a disposal dump as a sealing material or as a sub-structure of traffic paths or as a compacted and immobilized product.

If the pollutants are introduced on account of accident floating on and/or in waters, then, according to the invention, the fly ash will be deposited on the water surface, the pollutants will be absorbed on the fly ash the mixture of fly ash and pollutant in the water is then sedimented and settles as a pollutant-immobilized mixture at the bottom of the waters and is solidified as such.

If the pollutants on account of storage were introduced floating on and/or in the pollutant reservoir functioning as a sedimentation facility and in the form of liquid and/or sludge phase and/or with solid sedimentation, then the invention calls for depositing dry fly ash on the surface of the pollutant reservoir or introducing a fly-ash/water suspension absorbing the pollutants on the fly ash, whereupon the mixture of fly ash and pollutant is sedimented and is deposited in the form of a pollutant-immobilized mixture at the bottom of the pollutant reservoir and further is consolidated.

If the pollutants in the sedimentation facility functioning as pollutant reservoir are stored in solid form, then the invention calls for applying the suspension of fly ash and water to the surface of the pollutant reservoir, said suspension then being sedimented, settled and consolidated.

To assure reliable covering, a cement-activated suspension of fly ash and water mixed with elastic materials such as textile shreds is sedimented on the surface of the pollutant reservoir and/or of the sedimentation layer, settled and consolidated.

The invention is elucidated in illustrative embodiments below.

Figure 1C:
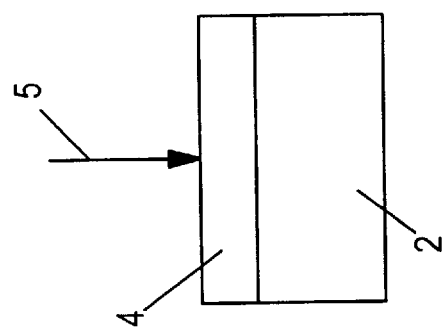
Figure 1B:
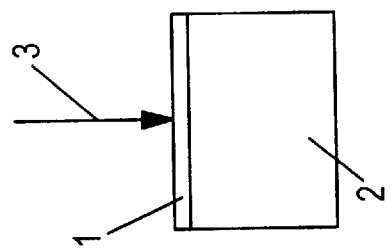
Figure 1A:
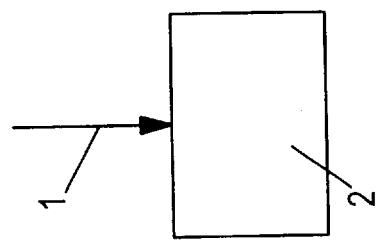
Figure 2:
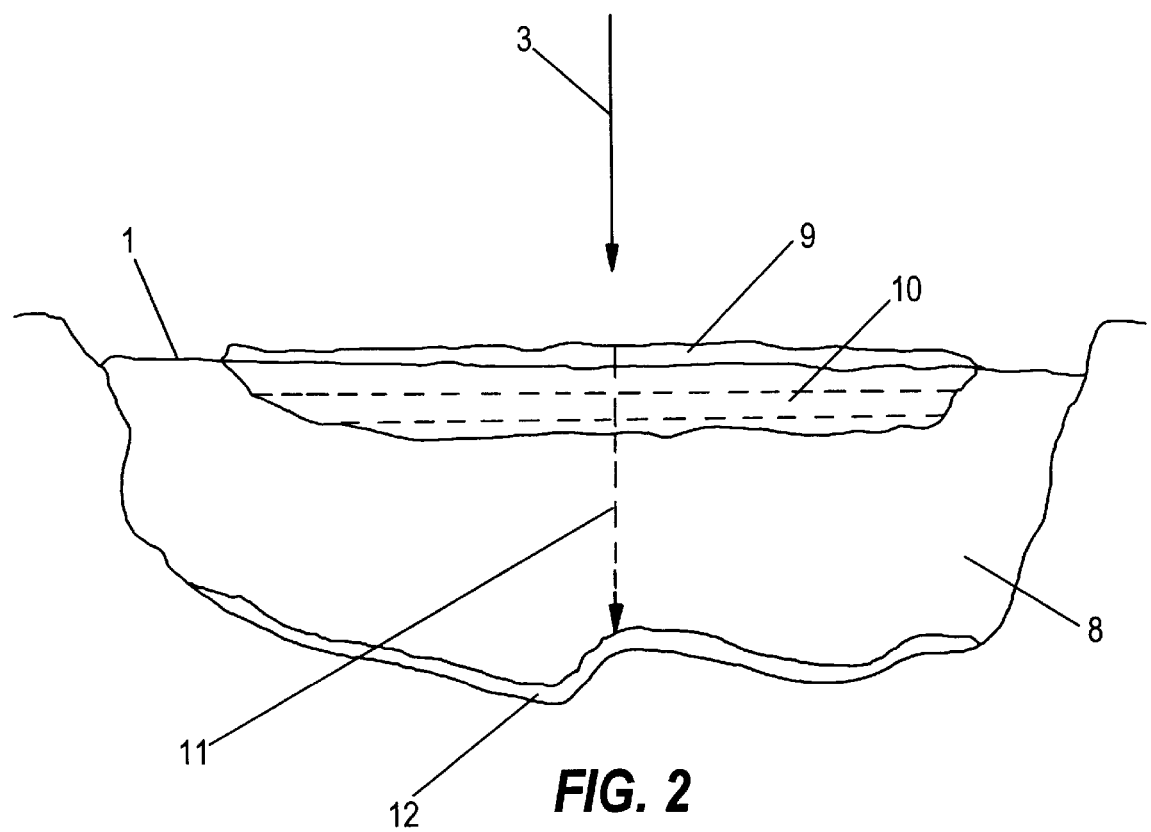
Figure 3:
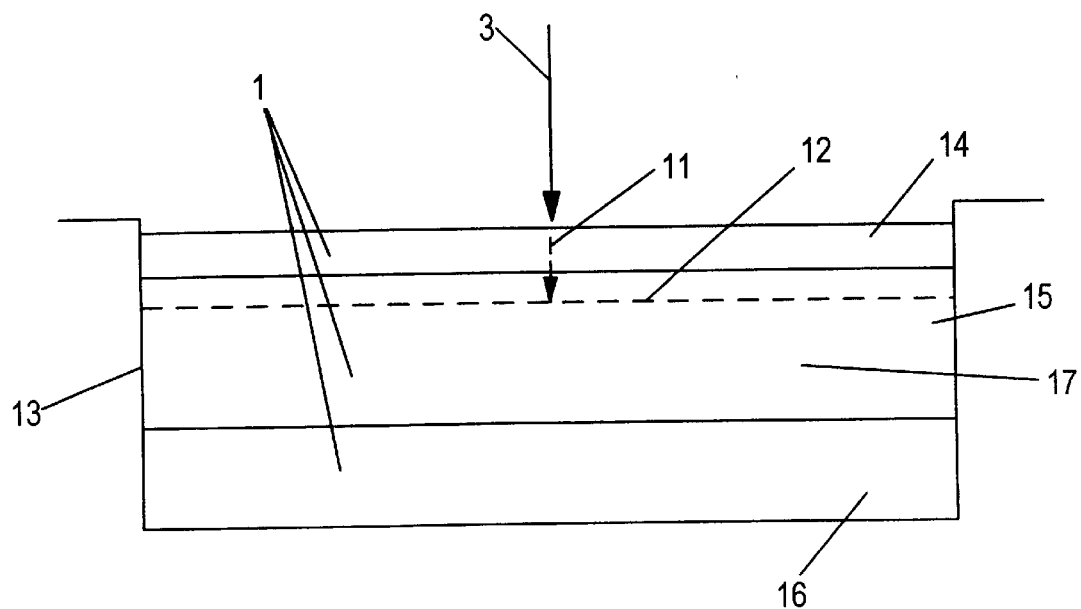

FIG. 1(a)–1(d) diagrammatically shows the engineering sequence of the immobilization of a pollutant spread at the bottom following an accident, FIG. 2 is a functional representation of the engineering sequence in immobilizing a pollutant spread in waters following an accident, FIG. 3 is a functional representation of the engineering sequence in immobilizing a pollutant introduced on account of waste-disposal storage or sedimentation.

Due to an accident, the pollutant 1, for instance oil, arrives at the surface of the sandy bottom 2 (FIG. 1a). Plain fly ash or cement-activated 3 fly-ash evincing a large surface and with a hollow-sphere configuration is spread on the surface of the pollutant distributed across the bottom 2 (FIG. 1b). Advantageously the fly ash from lignite-powder fired boilers is used. The fly ash 3 adsorbs the pollutant 1 and forms the pollutant-incorporated mixture 4 into which water is then admixed (FIG. 1c). The total proportion of water is 10% of the introduced dry mass and it activates the fly ash 3. The mixture 6 so produced of pollutant, fly ash and water is mixed or absorbed or incorporated ready for use at the plant and is mixed for use at the site of use (FIG. 1d). The mixture 6 of pollutant, fly ash and water (FIG. 1d) is processed into a seamless sealant 7 for a disposal facility or into a seamless traffic-path substructure. The mixture so immobilized furthermore is immediately sedimentable. Following hardening the pollutant is immobilized long-term and in non-leaching manner. This technology applies just as well to immobilize tars, phenols and other pollutants issuing after an accident.

Following an accident, the pollutant 1 is introduced into the waters 8 with the floating portion 9 and the suspended portion 10 (FIG. 2). Fly ash or cement-activated fly ash 3 is simultaneously applied to the surface of the waters 8 and in the zone where the pollutant 1 is propagating.

By means of the sedimentation 11, the fly ash 3 binds the portion 9 floating at the surface with the suspended portion 10 by means of the water in the waters 8.

The water-activated mixture of fly ash and pollutant sediments in the waters 8 and deposits at the waters bottom where it consolidates in the form of an immobilized layer 12. This layer 12 is stable over the long-term and prevents leaching.

Pollutants 1 in the form of a liquid phase 14 with floating pollutants and suspended pollutants in the form of a sludge phase 15 and solid sediments 16 are incorporated into the pollutant reservoir 13 designed as a disposal or sedimentation site (FIG. 3). The fly ash 3 is applied in dry form or as a suspension of water and fly ash to the surface of the liquid phase 14.

The floating portions of the pollutant in the liquid phase 14 are absorbed on the fly ash 3 by the sedimentation 11. The sludge portions of the pollutants in the sludge phase 15 also are absorbed on the fly ash 3 by sedimentation, the sludge layer 17 being compacted. The activated mixture of fly ash and pollutants is sedimented in the phases 14, 15 and deposits on the compacted sludge layer 17 and consolidates in the form of a compacted layer 12. This layer 12 also is stable long-term and leaching-resistant.

Moreover the solid sedimentation 16 and the sludge layer 17 are covered. The liquid and portions of the sludge phases 14, 15 are purified to such extent that they are removed as water and for instance may be used as a recirculation or recycling medium or may be used further after passing through water-processing plants.

Further layers may be deposited on the layer 12 by introducing a suspension of fly ash and water, by sedimenting, settling and compacting.

The layer 12 and the further layers also are immobilized, stable and leaching-resistant layers, whereby covering of the disposal site or of the old sedimentation takes place.

Again it is possible to cover trough-shaped pollutant reservoirs such as tar lakes with floating and suspended portions.

In such cases dry fly ash or a fly-ash suspension is introduced, whereby the fly ash absorbs the floating and suspended portions and sediments as a mixture of ash and pollutant.

The liquid phases so purified again are able to settle.

Particular advantages are achieved when elastic materials such as textile shreds are added to the cement-activated suspension of ash and water and also are sedimented, settled and compacted. As a result an elastic layer is created which acts as a covering resistant to high loads.

It is also possible to fit a waste disposal or an old dump with solid wastes with such layers.

The following advantages are offered by the invention:

1. Binding and immobilizing pollutants by absorption and diffusion of the pollutants into the fly ash when the pollutants are in liquid and/or sludge form,
2. The formed layers constitute coverings protecting the surfaces, with sealing and odor-protection functions,
3. The formed layers are resistant to high loads, offer leaching-protection and are stable,
4. The technology of the invention is implementable in simple and economic manner,
5. Fly ash is available any time at economic rates. It requires no further processing but instead is used in the state in which it was produced. Where called for cement activation is carried out,
6. Old waste problems can be resolved reliably, economically and ecologically,
7. The previous high costs for the manufacture and application of absorbents and waste removal are substantially eliminated.

I claim:

1. A process for absorption of organic, environment-harming pollutants floating and/or suspended in water or a dump designed as a pollutant reservoir containing at least one of a liquid phase, a sludge phase and a deposit of solids, comprising the step of:

applying an ash selected from the group consisting of fly ash and cement-activated fly ash onto a surface of the water or the dump containing the pollutant, whereby the ash combines with the pollutant to form a mixture which settles and sinks in solid form, wherein the ash has a hollow spherical structure and a high surface area.

2. The process of claim 1, wherein the ash is fly ash and is obtained from combustion of powdered lignite.

3. The process of claim 1, wherein the pollutant is selected from the group consisting of oil, tar and phenols.

4. The process of claim 1, further comprising the step of sedimenting the solid form from the liquid phase and drawing-off or evaporating the sediment in a pollution-free manner.

5. The process of claim 1, wherein the fly ash is applied to a surface of a cleaned liquid phase, settled-out, deposited in a pollution-free manner, and solidified.

6. The process of claim 1, further comprising the step of forming a suspension of water and the fly ash or cement-activated fly ash before application thereof to the surface of the water or the dump.

7. The process of claim 6, wherein cement-activated ash is selected, and comprises the further step of adding to the suspension a particulate flexible material to facilitate sedimentation.

\* \* \* \* \*